(12) United States Patent
Wang et al.

(10) Patent No.: US 7,253,967 B2
(45) Date of Patent: Aug. 7, 2007

(54) OPTICAL ASSEMBLY WITH A LENS MAGNIFICATION-ADJUSTING FUNCTION

(75) Inventors: Yen-Lin Wang, Taipei (TW); Hsu-Hsin Huang, Chang-Hua Hsien (TW); Hung-Wen Liu, Tao-Yuan Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 11/426,014

(22) Filed: Jun. 23, 2006

(65) Prior Publication Data

US 2006/0291074 A1 Dec. 28, 2006

(30) Foreign Application Priority Data

Jun. 24, 2005 (TW) ............................... 94121221 A (51) Int. Cl.
*G02B 15/14* (2006.01)
*G02B 7/02* (2006.01)
*G03B 17/00* (2006.01)

(52) U.S. Cl. ...................... 359/696; 359/694; 359/699; 359/700; 359/822; 359/823; 359/825; 396/72; 396/85

(58) Field of Classification Search ........ 359/694–701, 359/822, 823, 825; 396/62, 72–75, 85, 349, 396/350

See application file for complete search history.

(56) References Cited

U.S. PATENT DOCUMENTS

| | | | | |
|---|---|---|---|---|
| 4,380,378 A | * | 4/1983 | Tamura | 359/699 |
| 4,458,990 A | * | 7/1984 | Kawai | 359/700 |
| 4,484,800 A | * | 11/1984 | Tamura | 359/699 |
| 4,639,083 A | * | 1/1987 | Fuziwara et al. | 359/825 |
| 4,806,000 A | * | 2/1989 | Shiokama et al. | 359/706 |
| 4,834,514 A | * | 5/1989 | Atsuta et al. | 359/699 |
| 4,865,433 A | * | 9/1989 | Okajima et al. | 359/694 |
| 5,293,192 A | * | 3/1994 | Akitake et al. | 396/62 |
| 6,507,705 B1 | * | 1/2003 | Kasha | 396/72 |

\* cited by examiner

*Primary Examiner*—Loha Ben
(74) *Attorney, Agent, or Firm*—Winston Hsu (57) ABSTRACT

An optical assembly includes a barrel including a slot, a lens installed inside the barrel for magnifying an image, a magnification-adjusting mechanism installed outside and around the barrel including an adjusting loop installed outside the barrel in a rotatable manner including a groove on a side facing the barrel, and a roller installed between the adjusting loop and the barrel. The optical machine further includes a rod for adjusting the magnification of the lens. One end of the rod is installed inside the slot of the barrel in a slidable manner, and another end of the rod is installed inside the groove of the adjusting loop in a slidable manner.

9 Claims, 10 Drawing Sheets

OPTICAL ASSEMBLY WITH A LENS MAGNIFICATION-ADJUSTING FUNCTION

BACKGROUND OF THE INVENTION

1. Field of the Invention

The present invention relates to an optical assembly with a lens magnification-adjusting function, and more particularly, to an optical assembly having tangential actuation.

2. Description of the Prior Art

In conferences, a host can project related material or graphs onto a screen with a projector to let participants better understand the discussion. However, with the advance of video/audio equipments and storage media, such as high power stereos and large capacity DVDs, families can also enjoy the same experience in a home theater through an extra-large screen and a projector in combination with a stereo sound system.

Figure 1:
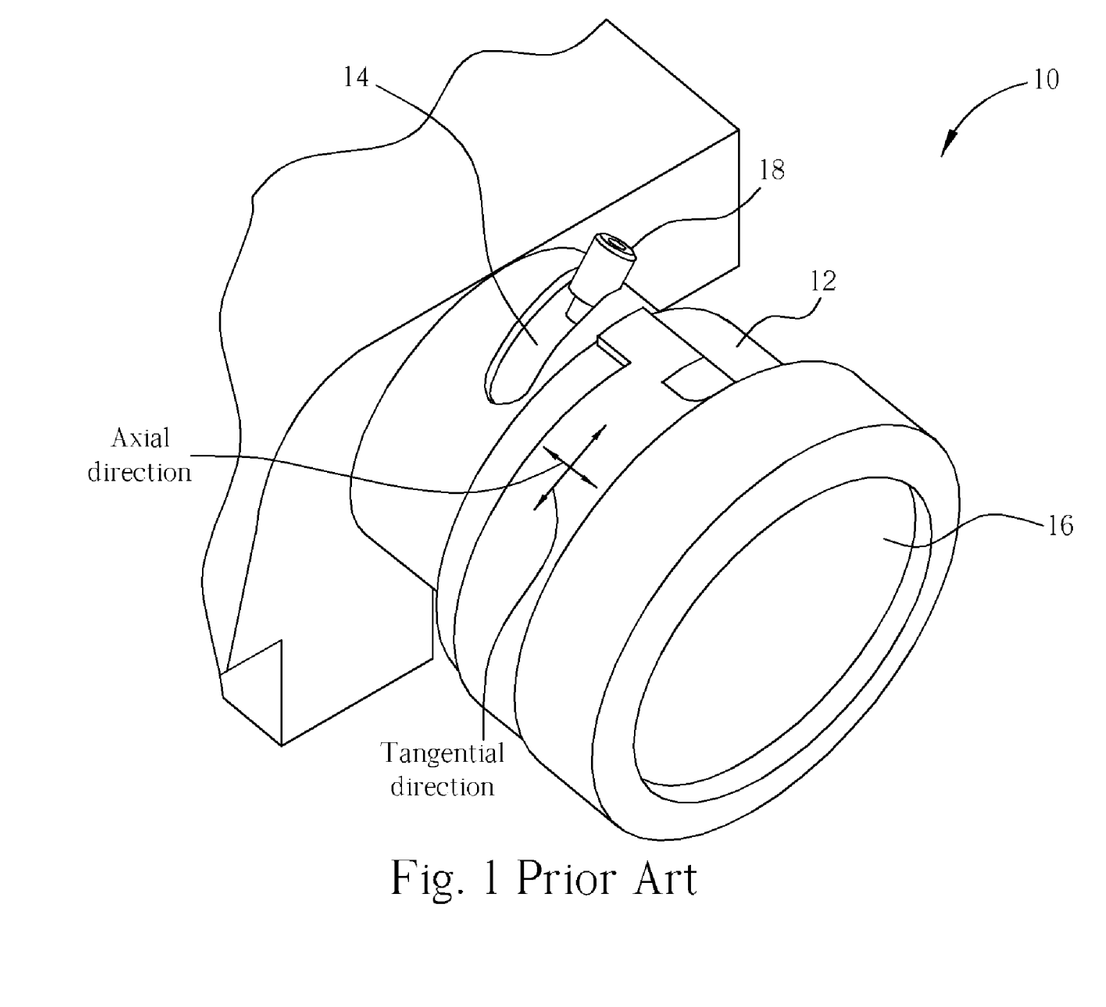
FIG. 1 is a schematic diagram of an optical assembly of a projector of the prior art.

Please refer to FIG. 1. FIG. 1 is a schematic diagram of an optical assembly 10 of a projector of the prior art. The optical assembly 10 includes a barrel 12 including a spiral slot 14, a lens 16 installed inside the barrel 12 for magnifying an image, and a rod 18. The rod 18 is installed within the slot 14 of the barrel 12 in a slidable manner. The movement of the rod 18 is constrained by the slot 14 of the barrel 12 so that the magnification (zoom in/zoom out) is adjusted by the rod 18. That is, a displacement of the rod 18 consists of a combination of a tangential displacement and an axial displacement relative to the barrel 12. This kind of magnification-adjusting mechanism is very common, for example, consider many optical assemblies manufactured by Zeiss®. However, users are used to rotating the barrel 12 for adjusting magnification of the lens 16. That is, users are familiar with magnification-adjusting mechanisms requiring tangential movement of the barrel 12 instead of axial movement relative to the barrel 12. Thus, the magnification-adjusting mechanism of the optical assembly 10 does not correspond to the habits of users such that it is inconvenient for users to operate the magnification-adjusting mechanism of the optical assembly 10.

SUMMARY OF THE INVENTION

It is therefore a primary objective of the claimed invention to provide an optical assembly with a lens magnification-adjusting function for solving the above-mentioned problem.

According to the claimed invention, an optical assembly includes a barrel including a slot, a lens installed inside the barrel for magnifying an image, a magnification-adjusting mechanism installed outside and around the barrel including an adjusting loop installed outside the barrel in a rotatable manner including a groove on a side facing the barrel, and a roller installed between the adjusting loop and the barrel. The optical assembly further includes a rod for adjusting the magnification of the lens. One end of the rod is installed inside the slot of the barrel in a slidable manner, and another end of the rod is installed inside the groove of the adjusting loop in a slidable manner.

According to claimed invention, a magnification-adjusting module includes a barrel including a slot, a lens installed inside the barrel for magnifying an image, a magnification-adjusting mechanism installed outside and around the barrel including an adjusting loop installed outside the barrel in a rotatable manner including a groove on a side facing the barrel, and a roller installed between the adjusting loop and the barrel. The magnification-adjusting module further includes a rod for adjusting the magnification of the lens. One end of the rod is installed inside the slot of the barrel in a slidable manner, and another end of the rod is installed inside the groove of the adjusting loop in a slidable manner.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
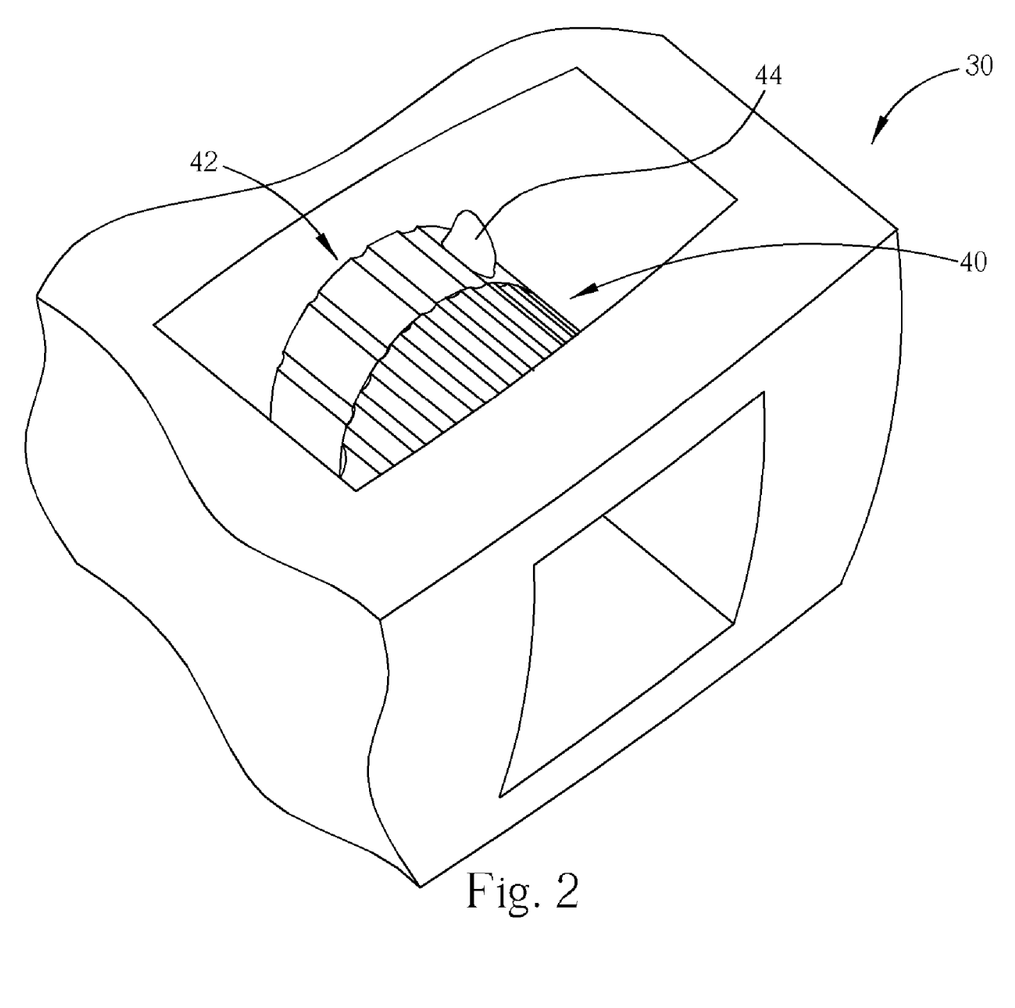
FIG. 2 is a perspective drawing of an optical assembly according to an embodiment of the present invention.
Figure 3:
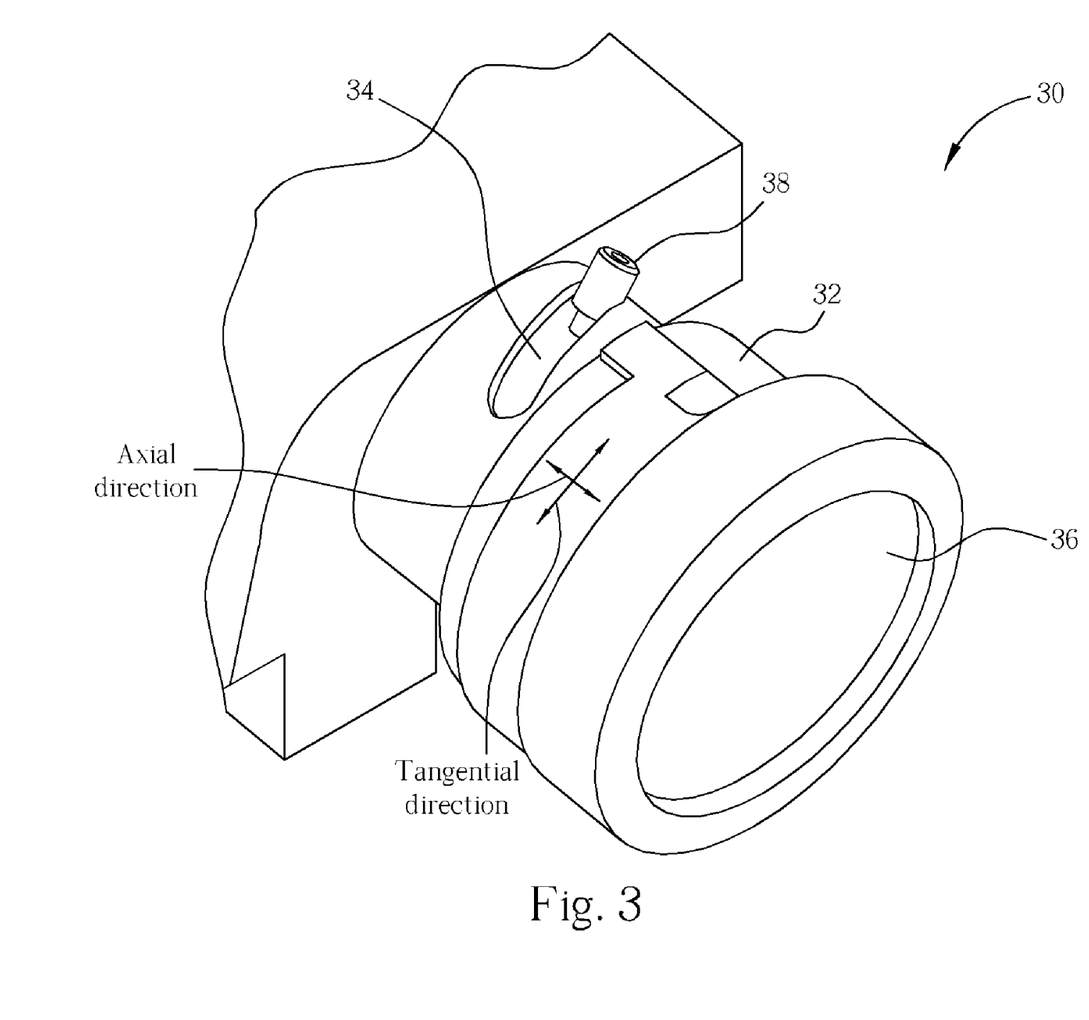
FIG. 3 is a schematic diagram of internal components of the optical assembly according to the embodiment of the present invention.

Please refer to FIG. 2 and FIG. 3. FIG. 2 is a perspective drawing of an optical assembly 30 according to an embodiment of the present invention. FIG. 3 is a schematic diagram of internal components of the optical assembly 30 according to the embodiment of the present invention. The optical assembly 30 can be an optical assembly of a projector. As shown in FIG. 3, the optical assembly 30 includes a barrel 32 including a spiral slot 34, a lens 36 installed inside the barrel 32 for magnifying an image, and a rod 38 for adjusting magnification of the lens 36. One end of the rod 38 is installed inside the slot 34 of the barrel 32 in a slidable manner. The movement of the rod 38 is constrained by the slot 34 of the barrel 32. That is, a displacement of the rod 38 consists of a tangential displacement and an axial displacement relative to the barrel 32. As shown in FIG. 2, the optical assembly 30 further includes a magnification-adjusting mechanism 40 installed outside and around the barrel 32. The magnification-adjusting mechanism 40 includes an adjusting loop 42, and a protruding structure 44 for being pushed so as to drive the adjusting loop 42 to rotate around the barrel 32.

Figure 4:
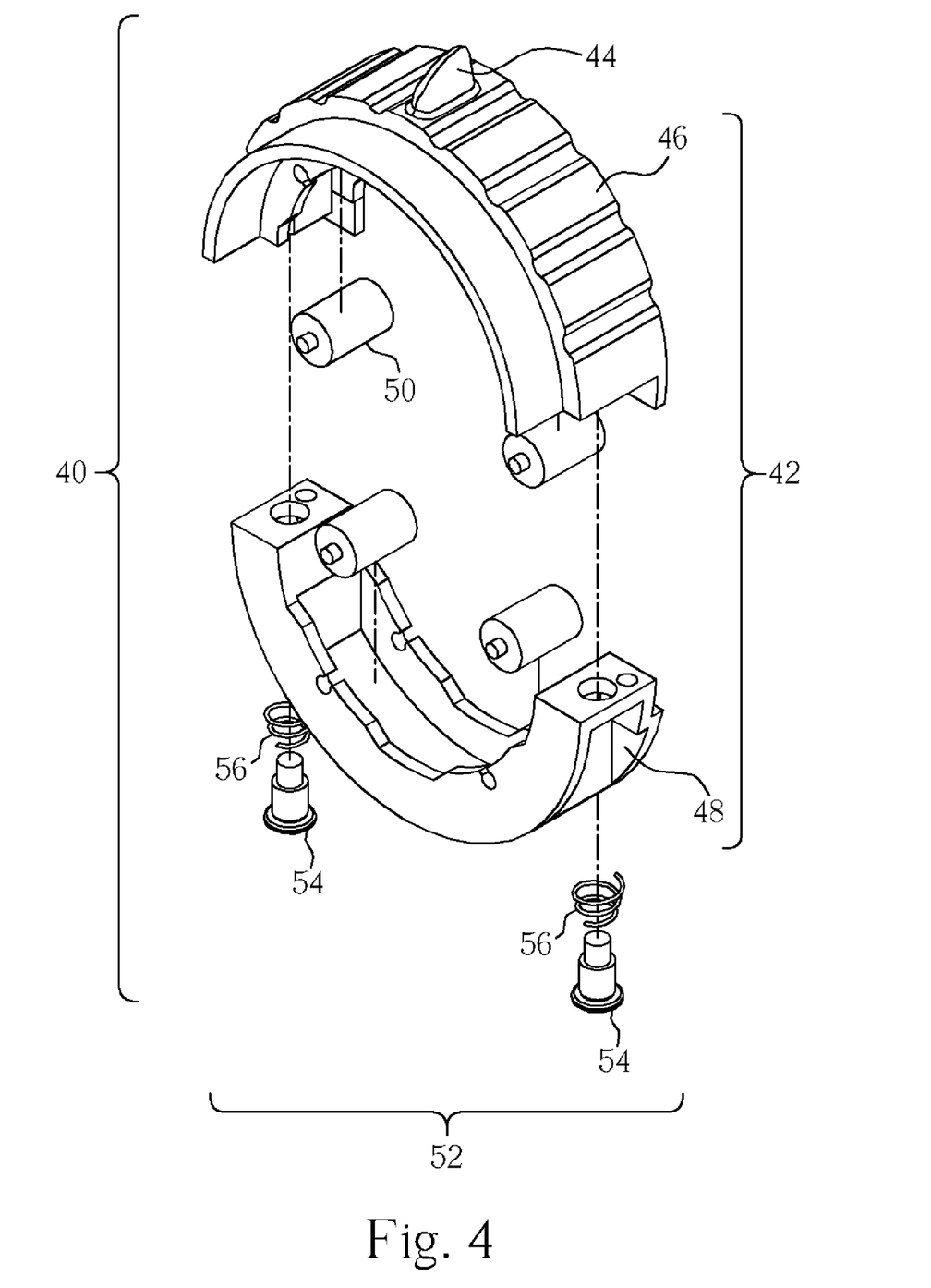
FIG. 4 is an exploded diagram of a magnification-adjusting mechanism according to the embodiment of the present invention.
Figure 5:
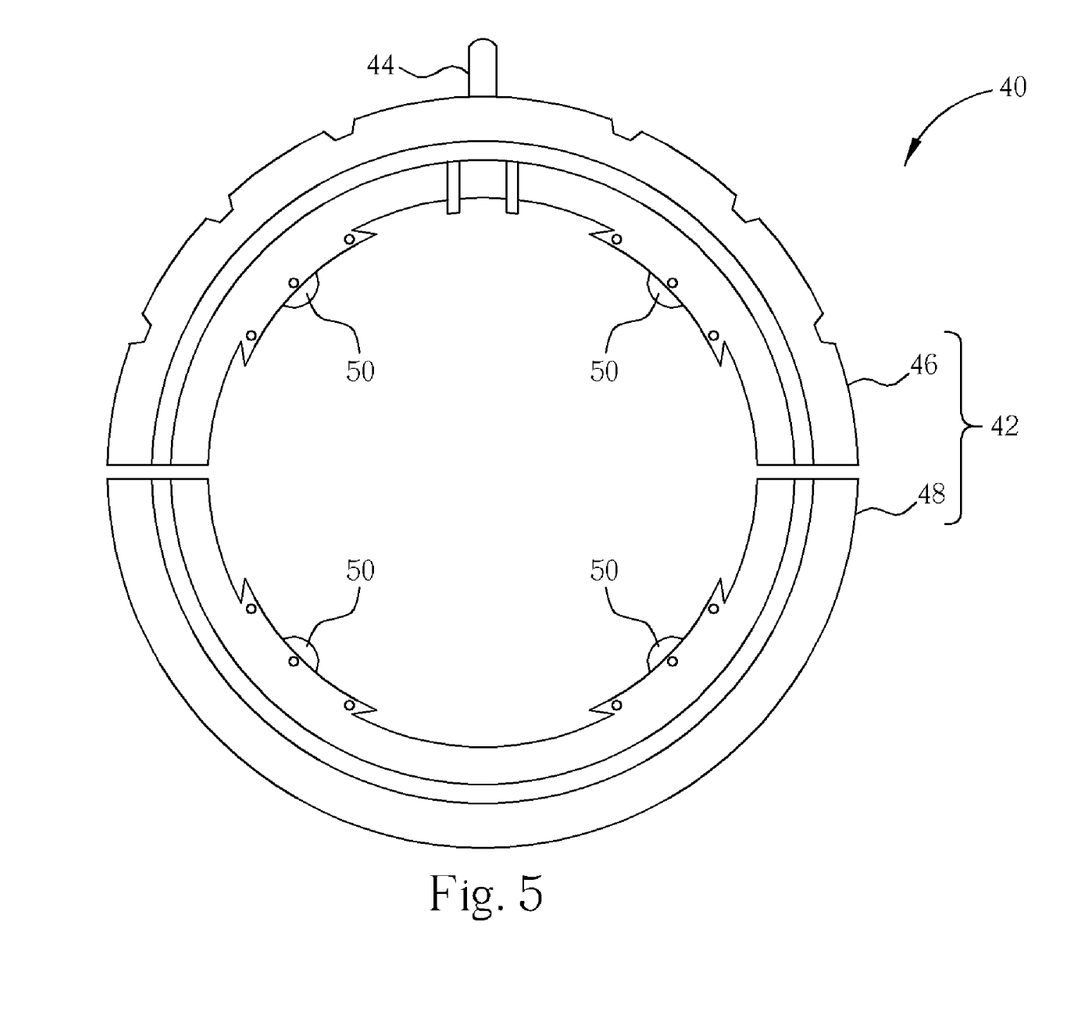
FIG. 5 is an assembly drawing of the magnification-adjusting mechanism according to the embodiment of the present invention.

Please refer to FIG. 4 and FIG. 5. FIG. 4 is an exploded diagram of the magnification-adjusting mechanism 40 according to the embodiment of the present invention. FIG. 5 is an assembly drawing of the magnification-adjusting mechanism 40 according to the embodiment of the present invention. The adjusting loop 42 includes an upper chain 46. The protruding structure 44 is positioned on the upper chain 46. The adjusting loop 42 further includes a lower chain 48, and four rollers 50 connected to the upper chain 46 and the lower chain 48. The number of rollers 50 is not limited. The adjusting loop 42 further includes a locking component 52 for locking the upper chain 46 and the lower chain 48. The locking component 52 includes two screws 54 and two springs 56 sheathed over the two screws 54. The combination of the screws 54 and the springs 56 connects the upper chain 46 and the lower chain 48. The tangent force at the joint of the upper chain 46 and the lower chain 48 depends on the elastic force provided by the springs 56. The normal forces applied on the rollers 50 from the upper chain 46 and the lower chain 48 can be adjusted by torque applied to the springs 56 when screwing the screws 54. It can prevent the normal forces applied on the rollers 50 from being influenced by the mechanical assembly. Furthermore, in case of utilizing different lenses in necessary, the normal forces applied on the rollers 50 from the upper chain 46 and the lower chain 48 can be adjusted by torque applied to the springs 56 when screwing the screws 54. It can uniformize torque for adjusting the different lenses.

Figure 6:
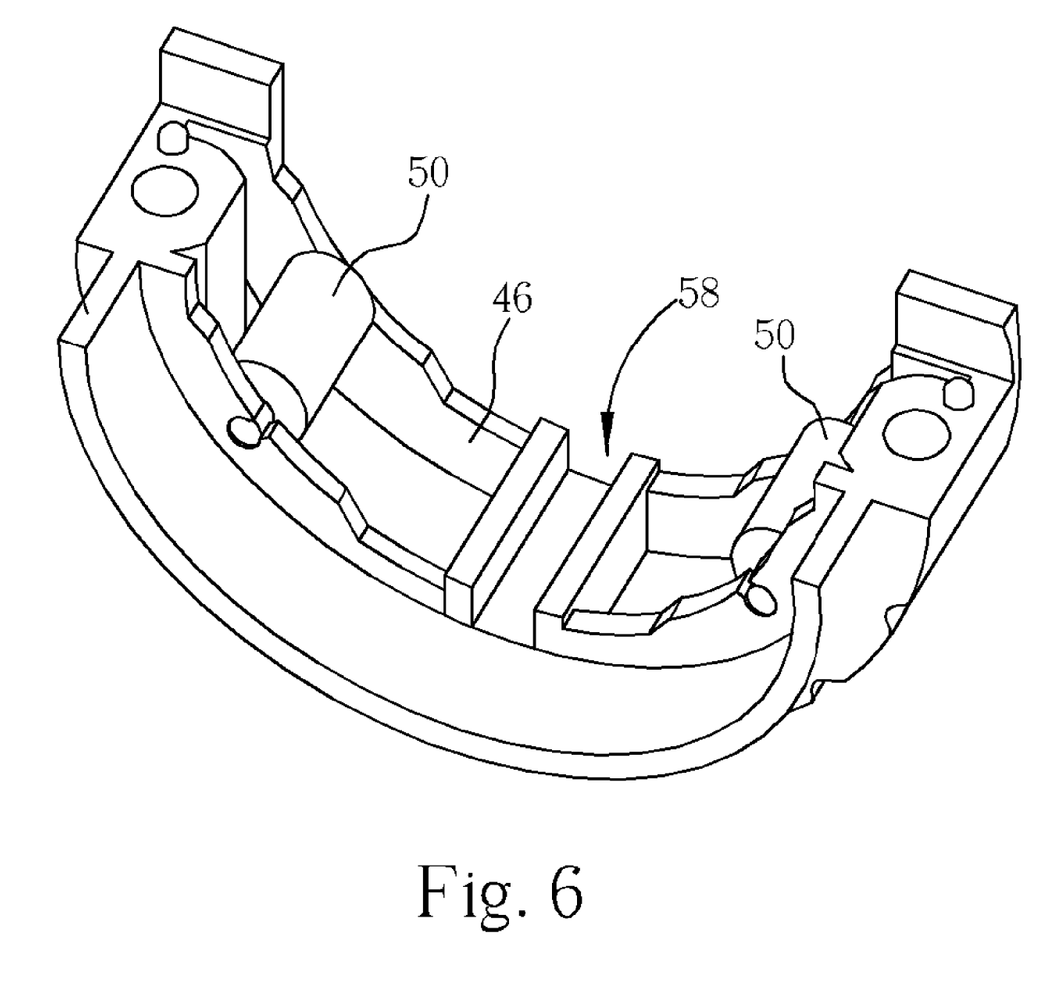
FIG. 6 is a diagram of an internal structure of an upper chain according to the embodiment of the present invention.
Figure 7:
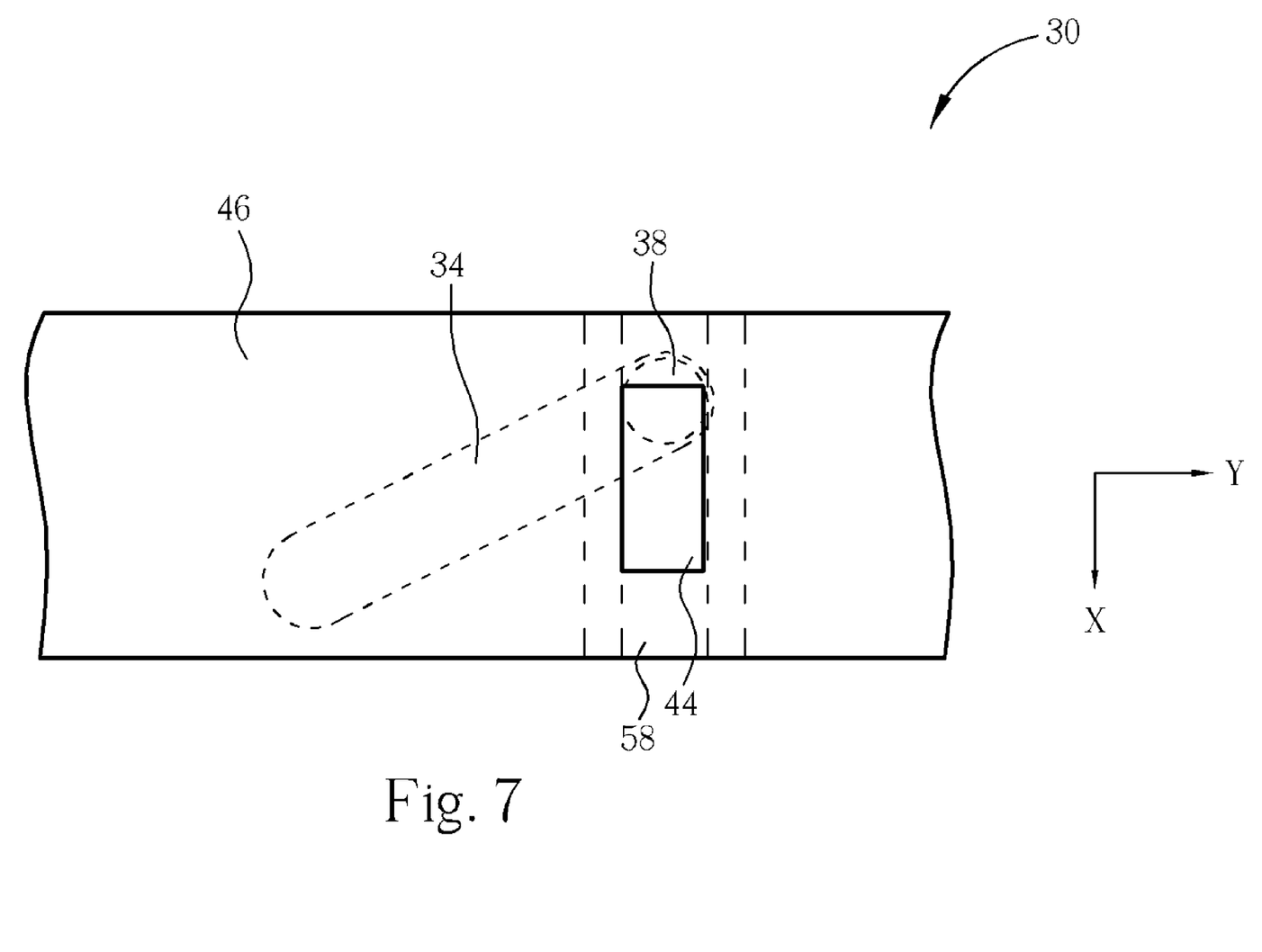
FIG. 7 is a top view of a rod positioned in a groove at a first position according to the embodiment of the present invention.
Figure 8:
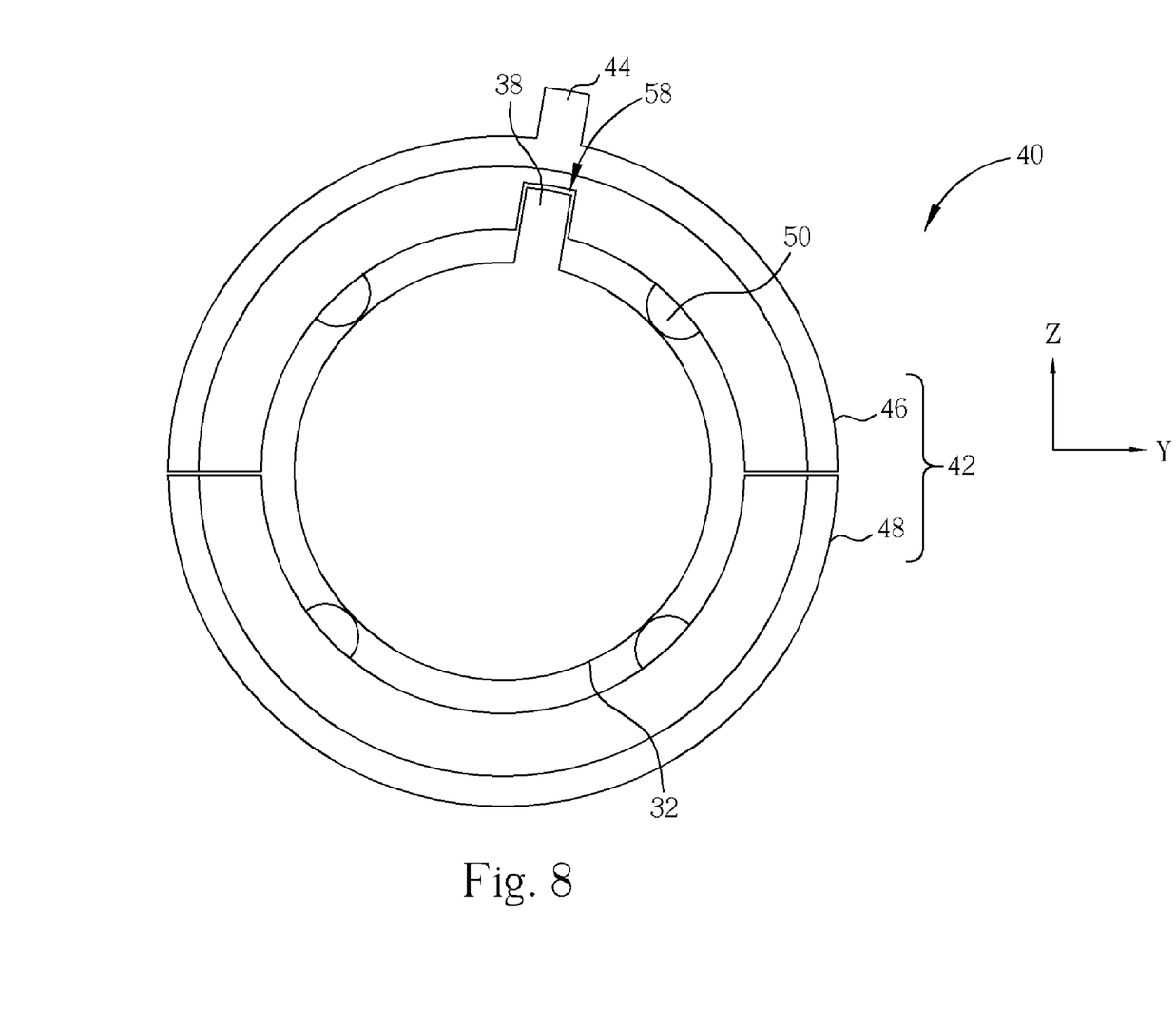
FIG. 8 is a front view of the rod positioned in the groove at the first position according to the embodiment of the present invention.
Figure 9:
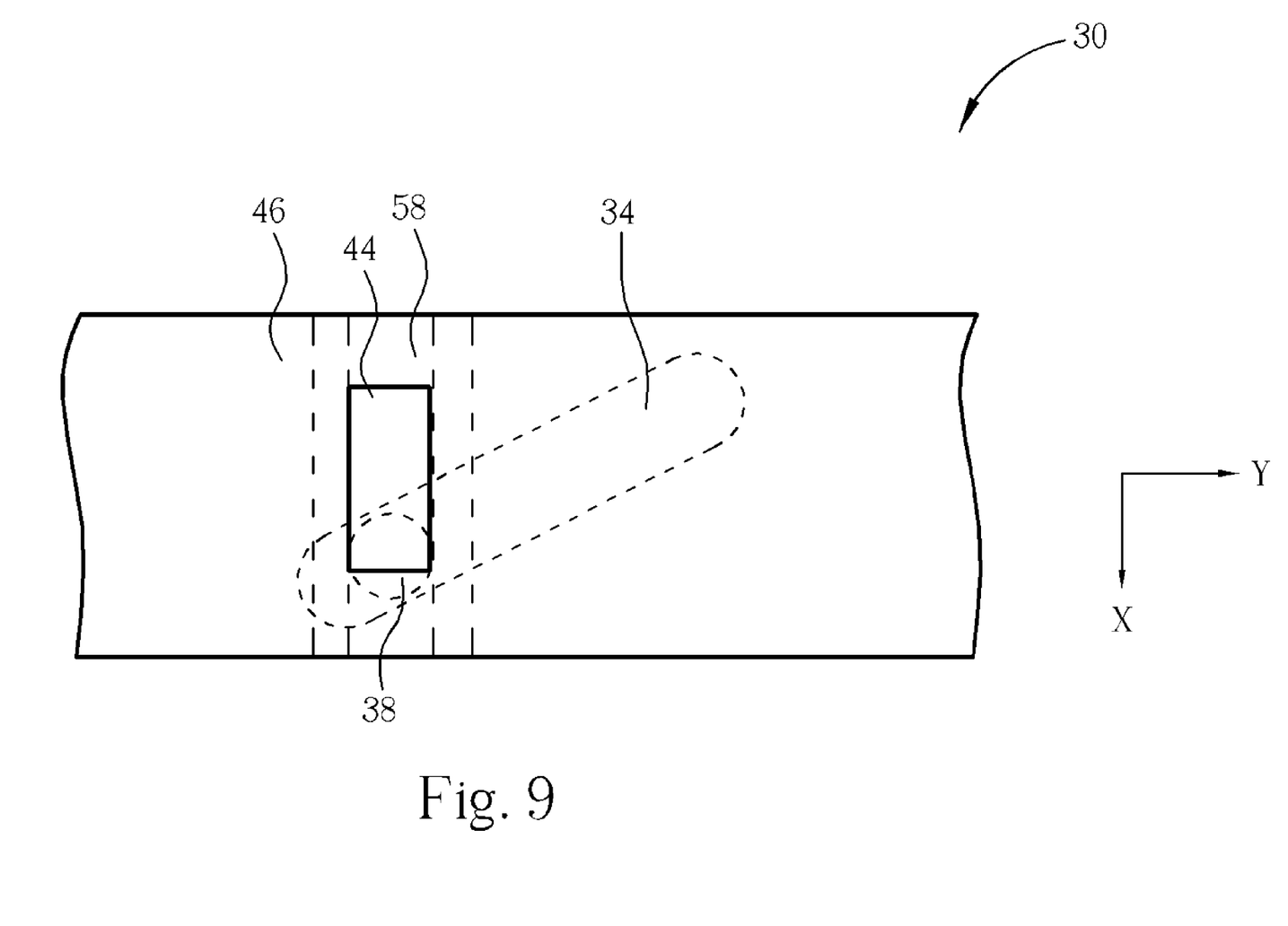
FIG. 9 is a top view of the rod positioned in the groove at a second position according to the embodiment of the present invention.
Figure 10:
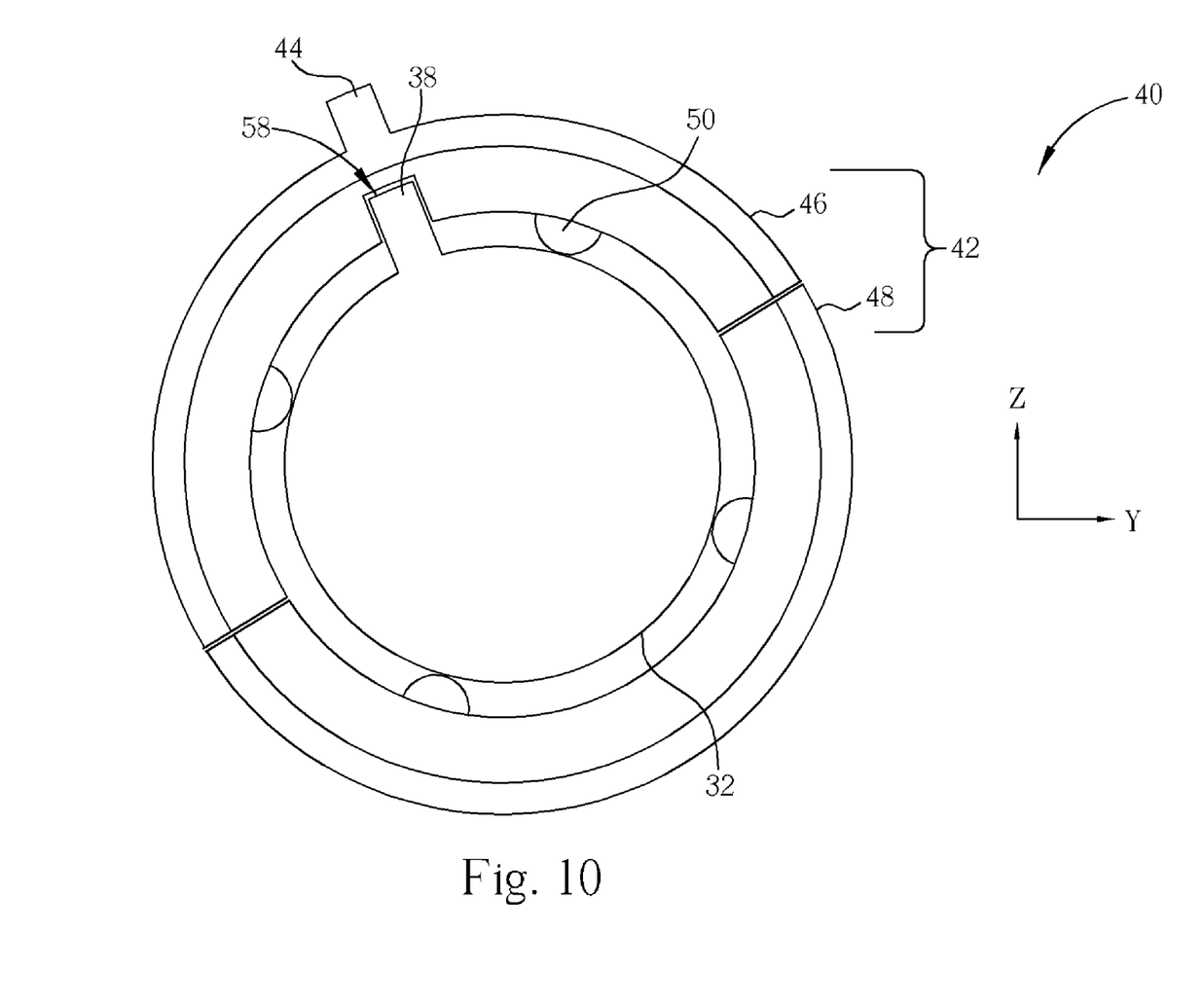
FIG. 10 is a front view of the rod positioned in the groove at the second position according to the embodiment of the present invention.

Please refer to FIG. 6. FIG. 6 is a diagram of an internal structure of the upper chain 46 according to the embodiment of the present invention. The inner side of the upper chain 46 includes a groove 58. The other end of the rod 38 is installed inside the groove 58 of the upper chain 46 in a slidable manner. Please refer to FIG. 7, FIG. 8, FIG. 9, and FIG. 10. FIG. 7 is a top view of the rod 38 positioned in the groove 58 at a first position according to the embodiment of the present invention. FIG. 8 is a front view of the rod 38 positioned in the groove 58 at the first position according to the embodiment of the present invention. FIG. 9 is a top view of the rod 38 positioned in the groove 58 at a second position according to the embodiment of the present invention. FIG. 10 is a front view of the rod 38 positioned in the groove 58 at the second position according to the embodiment of the present invention. One end of the rod 38 is installed inside the slot 34 in a slidable manner, and the other end of the rod 38 is installed inside the groove 58 of the upper chain 46 in a slidable manner. When the protruding structure 44 on the upper chain 46 is pushed so as to drive the adjusting loop 42 to rotate around the barrel 32, the other end of the rod 38 installed inside the groove 58 is capable of sliding inside the groove 58 in an X direction. At the same time, the displacement of the end of the rod 38 connected to the barrel 32 consists of a displacement in the X direction, a displacement in a Y direction, and a displacement in a Z direction, that is, a spiral-like displacement in 3-D space. Therefore, the adjusting loop 42 rotates in the tangential direction of the barrel 32 for adjusting magnification of the lens 36. The groove 58 of the upper chain 46 constrains the movement in the Y direction of the rod 38. For instance, when the adjusting loop 42 and the rod 38 is moved from the first position to the second position by pushing the protruding structure 44 on the upper chain 46, there are displacements of the end of the rod 38 connected to the barrel 32 inside the slot 34 of the barrel 32 in the X direction, in the Y direction, and in the Z direction. However there are only displacements of the other end of the rod 38 inside the groove 58 in the +X direction and in the −Z direction so as to rotate the adjusting loop 42 in the tangential direction of the barrel 32 for driving the end of the rod 38 connected to the barrel 32 to slide inside the slot 34.

In addition, the rollers 50 are positioned between the adjusting loop 42 and the barrel 32 so as to reduce friction between the inner side of the adjusting loop 42 and the barrel 32 due to a relative rotation between the adjusting loop 42 and the barrel 32. That is, when the protruding structure 44 on the upper chain 46 is pushed so as to rotate the adjusting loop 42, the rollers 50 can be driven to rotate on the barrel 32 by the adjusting loop 42. There is a dynamic rotation friction between the magnification-adjusting mechanism 40 and the barrel 32 instead of a dynamic sliding friction between the magnification-adjusting mechanism 40 and the barrel 32 so that the user can operate the magnification-adjusting mechanism 40 smoothly.

The magnification-adjusting mechanism of the present invention is not limited to being utilized in an optical assembly of a projector. It can be utilized for any similar magnification-adjusting module, such as that of a camera or a telescope.

In contrast with the conventional optical assembly, the optical assembly according to the present invention can transform spiral magnification-adjusting motion into tangential magnification-adjusting motion so as to not only constrain an axial displacement of a rod to correspond to normal user habits but also provide a smooth magnification-adjusting mechanism. Furthermore, when utilizing different kinds of lenses, the compression applied to the springs when installing the screws can adjust normal forces applied to the rollers so as to control normal forces applied to the barrel by the rollers. This can ensure uniformity when adjusting different kinds of lenses.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical assembly comprising:
    a barrel comprising a slot;
    a lens installed inside the barrel for magnifying an image;
    a magnification-adjusting mechanism installed outside and around the barrel, the magnification-adjusting mechanism comprising:
        an adjusting loop installed outside the barrel in a rotatable manner, the adjusting loop comprising a groove on a side facing the barrel; and
        a roller installed between the adjusting loop and the barrel; and
    a rod for adjusting magnification of the lens, one end of the rod being installed inside the slot of the barrel in a slidable manner and another end of the rod being installed inside the groove of the adjusting loop in a slidable manner.

2. The optical assembly of claim 1 wherein the adjusting loop comprises:
    an upper chain;
    a lower chain; and
    a locking component for locking the upper chain and the lower chain.

3. The optical assembly of claim 2 wherein the locking component comprises:
    a screw; and
    a spring that sheathes the screw.

4. The optical assembly of claim 2 wherein the upper chain comprises a protruding structure for being pushed so as to drive the adjusting loop to rotate around the barrel.

5. The optical assembly of claim 1 being an optical assembly of a projector.

6. A magnification-adjusting module comprising:
a barrel comprising a slot;
a lens installed inside the barrel for magnifying an image;
a magnification-adjusting mechanism installed outside and around the barrel, the magnification-adjusting mechanism comprising:
an adjusting loop installed outside the barrel in a rotatable manner around the barrel, the adjusting loop comprising a groove on a side facing the barrel; and
a roller installed between the adjusting loop and the barrel; and
a rod for adjusting magnification of the lens, one end of the rod being installed inside the slot of the barrel in a slidable manner and another end of the rod being installed inside the groove of the adjusting loop in a slidable manner.

7. The magnification-adjusting module of claim 6 wherein the adjusting loop comprises:
an upper chain;
a lower chain; and
a locking component for locking the upper chain and the lower chain.

8. The magnification-adjusting module of claim 7 wherein the locking component comprises:
a screw; and
a spring that sheathes the screw.

9. The magnification-adjusting module of claim 8 wherein the upper chain comprises a protruding structure for being pushed so as to drive the adjusting loop to rotate around the barrel.

* * * * *